US008799225B2

(12) United States Patent
Vaitzblit et al.

(10) Patent No.: US 8,799,225 B2
(45) Date of Patent: Aug. 5, 2014

(54) PROCESS AND SYSTEM FOR AUDITING DATABASE ACTIVITY

(75) Inventors: Lev Vaitzblit, Concord, MA (US);
Jonathan Jesse, Hollis, NH (US); Jason Orendorff, Nashua, NH (US); Stephen Ng, Arlington, MA (US); Murray S. Mazer, Arlington, MA (US)

(73) Assignee: Lumigent Technologies, Inc., Acton, MA (US)

( * ) Notice: Subject to any disclaimer, the term of this patent is extended or adjusted under 35 U.S.C. 154(b) by 414 days.

(21) Appl. No.: 10/702,127

(22) Filed: Nov. 5, 2003

(65) Prior Publication Data

US 2005/0097149 A1    May 5, 2005

(51) Int. Cl.
G06F 17/30 (2006.01)
G06F 21/62 (2013.01)

(52) U.S. Cl.
CPC .... *G06F 21/6227* (2013.01); *G06F 2221/2101* (2013.01); *G06F 17/30368* (2013.01)
USPC .......................................................... 707/648

(58) Field of Classification Search
CPC ................................................ G06F 17/30368
USPC ....................... 707/102, 200, 202, 103 R, 648
See application file for complete search history.

(56) References Cited

U.S. PATENT DOCUMENTS

| 5,535,383 | A | * | 7/1996 | Gower | 707/103 R |
| 5,655,081 | A | | 8/1997 | Bonnell et al. | |
| 5,737,600 | A | * | 4/1998 | Geiner et al. | 707/200 |
| 5,978,594 | A | | 11/1999 | Bonnell et al. | |
| 6,363,391 | B1 | * | 3/2002 | Rosensteel, Jr. | 707/102 |
| 6,591,228 | B1 | * | 7/2003 | Hall et al. | 707/200 |
| 6,769,074 | B2 | | 7/2004 | Vaitzblit | |
| 7,000,118 | B1 | * | 2/2006 | Murthy et al. | 713/185 |
| 2002/0007363 | A1 | * | 1/2002 | Vaitzblit | 707/202 |
| 2002/0165724 | A1 | * | 11/2002 | Blankesteijn | 705/1 |
| 2004/0230623 | A1 | * | 11/2004 | D'Angelo et al. | 707/202 |

OTHER PUBLICATIONS

Lumigent, Log Explorer Walkthrough, Aug. 2002, Lumigent.com (Archived).*
ISDecisions, EvenTrigger 1.6, Jun. 2002, ISDecisions.com (Archived).*
Mazer, M.S., "Data Access Accountability; Who Did What to Your Data When?" A Lumigent® *Data Access Accountability*™ Series White Paper, Lumigent Technologies, Inc. (2002).
Sullivan, Patrick F., "Data Access Accountability for Electronic Records: Meeting 21 CFR Part 11 Compliance Requirements for Secure, Computer Generated Audit Trails," A Lumigent® *Data Access Accountability*™ Series White Paper, Lumigent Technologies, Inc. (2002).

(Continued)

*Primary Examiner* — Jorge A Casanova
(74) *Attorney, Agent, or Firm* — Sheppard, Mullin, Richter & Hampton LLP

(57) ABSTRACT

Described is a database audit system used to monitor, and optionally alert on database activity, providing a complete record of access to data and database structure. The data audit system may also provide an audit trail of data accesses and changes to database schema and permissions. A database audit may be performed by collecting data from database transaction logs and traces, exporting the collected data into a repository, and analyzing the data in the repository to create data audit reports and to provide data audit browsing capabilities.

57 Claims, 13 Drawing Sheets

(56) References Cited

OTHER PUBLICATIONS

"Log Explorer for Oracle Advances Enterprise Data Integrity; Lumigent Technologies' Software Quickly Identifies, Corrects Difficult Database Problems," S. Myers and M. Grabscheid, eds., Oct. 7, 2002.

"Log Explorer 3.0 Improves Data Integrity by Identifying and Correcting Structural Database Problems," S. Myers and M. Grabscheid, eds., Jun. 3, 2002.

"Computerworld Selects Lumigent Technologies as Top Emerging Company," S. Myers and M. Grabscheid, eds., Nov. 27, 2001.

"Log Explorer 3.0; Transaction Analysis, Auditing, and Data Recovery for SQL Server™," Lumigent Technologies, Inc. (2002).

"Log Explorer for Oracle8*i*™; Transaction Analysis and Data Recovery for Oracle8*i*," Lumigent Technologies, Inc. (2003).

McGehee, B.M., "Lumigent's Log Explorer 3.0 Can Save the Day," SQL-Server-Performance.Com [online], no date given, Reprinted with permission from http://sql-server-performance.com.

Knight, B., "Review: Recover from Almost Anything with Log Explorer 3.0," [online] posted Jul. 23, 2002, Reprinted with permission from SQLServerCentral.com.

FAQs: Log Explorer® V3.0, © Lumigent Technologies, Inc., no date given, 6 pp.

IPLocks, Product Information; Database Security Monitoring, Assessment & Auditing [online], © 2004, IPLocks, Inc. All Rights Reserved, http://www.iplocks.com/oroduct/asp, 4 pp.

DataMirror Products, DataMirror LiveAudit™ [online], http://www.datamirror.com/products/liveaudit/, 1 p.

NetIQ Vulnerability Manager [online], http://www.netiq.com/products/vsm/default.asp, 2 pp.

Lumigent® Log Explorer® Getting Started Guide, Log Explorer® Version 3.3 for Microsoft® SQL Server™ 7.0 and 2000, © 2000-2003 Lumigent Technologies, Inc., All Rights Reserved; 52 pp.

* cited by examiner

Collection Table 702

| Row ID | Data Start Marker | Data End Marker | Import Start Time | Import End Time | Status | File Name | | | |
|---|---|---|---|---|---|---|---|---|---|
| 1 | 1.2.3 | 1.2.4 | 1:00 | 1:15 | OK | X | | | |
| 2 | 1.2.4 | 1.2.5 | 2:00 | | Collecting | X | | | |
| 3 | 1.2.4 | 1.2.6 | 3:00 | 3:15 | OK | X | | | |

704  706  708  710  712  714  716

718 — row 1
720 — row 2
722 — row 3

Status: OK / collecting / collection failed / queued / transferring / fail

FIG. 7

|  | column 812a ↓ | 812b | 812c |  |
|---|---|---|---|---|
| record 808a → | One | Two | Three | Table A 810 |
| 808b → | 'a' | 1 | 1 | |
| | 'b' | 2 | 3 | |

FIG. 8A

PROCESS AND SYSTEM FOR AUDITING DATABASE ACTIVITY

BACKGROUND OF THE INVENTION

Enterprises today rely on database technology to run their businesses. Mission-critical and other data assets stored in the databases need to be safeguarded from inappropriate access and data changes. The need to protect data security and privacy has become of paramount concern to most organizations. Reasons for this concern include customer or supplier requirements, business practices, security policies and government regulations. Beyond what is commonly understood by "security," that is, preventing unauthorized access, there is a driving need for data access accountability: knowing who is doing what to which data and by what means.

Capturing a record of data accesses is a key step in maintaining the data accountability, yet common existing approaches may miss certain kinds of activity, introduce a false sense of security or interfere with runtime database performance. These approaches include application modification, mid-tier portals and trigger-based collection at the data source.

Application modification entails changing source code of every application that might be used to access the data of interest. Each application is changed so that it captures data modification and viewing information and stores it for further processing. Because each application must be modified, application modification can substantially increase the implementation cost of compliance with data auditing requirements. This may be especially true where legacy systems must be brought into compliance. In addition, this approach requires each application to be modified and does not capture activity outside the modified application, thus reducing confidence in the completeness of the audit trail. The audit trail may be incomplete because operations not handled by the modified applications may be missed, or because the audit does not record access directly to the underlying database.

The mid-tier portal approach funnels access to data from multiple applications or users through a shared portal that is responsible for the backend access. This portal can be modified to capture and store data access information. As with the application modification approach, the mid-tier portal approach may pose potential risks because operations and accesses outside of the portal enabled applications may be missed by the audit trail. Implementation costs may be high as well because other approaches to creating audit trails would be needed where data were not created, modified, or deleted through the portal-enabled applications. This limitation of the portal approach may make it an especially inappropriate solution for many legacy systems that contain data subject to the data auditing requirement.

The most common way of capturing data modification is using database triggers. A trigger is a special-purpose application logic that is executed when predetermined events occur. Triggers have a number of drawbacks: they are often hard to write correctly, they add substantial runtime performance overhead because they execute in line with transactions, they cannot capture data views, and they cannot generally capture changes to database schema and permissions. In addition, triggers may easily be disabled without detection. The performance cost often leads database administrators to minimize the number of triggers implemented, thus reducing completeness of the audit trail.

How a data access accountability solution captures the appropriate data for an audit trail is as important as determining what data should be captured. Once the appropriate level of detail for the audit trail is determined, an effective solution should provide confidence that all the relevant activities that create, modify or delete data will be captured and activities will not inadvertently be omitted from the audit trail.

SUMMARY OF THE INVENTION

A data audit system designed to help organizations address data privacy and security requirements with a complete audit of database activity may provide answers to the questions "who is doing what to which data when?" Such a system may be designed to monitor, and optionally alert on database activity, providing a complete record of access to data and database structure. The data audit system may also provide an audit trail of data accesses and changes to database schema and permissions. The audit trail may be in the form required by industry security or audit standards.

The task of safeguarding data assets is multi-faceted, but a central aspect is ensuring that data is changed only in intended ways and only the proper parties view the data. Implementing suitable privacy and security policies and mechanisms is an important step, but it does not address two important realities: even authorized users will sometimes access data inappropriately, whether deliberately or accidentally, and flaws in policy and implementation can introduce vulnerability, enabling unintended data access or database changes. Therefore, data audit trails are needed to capture information about data modification and accesses.

Databases generally maintain a transaction log—a log of all data modifications, that is used as a master record for recovery and backup purposes. The data from the transaction log may also be gathered and used for the data audit purposes.

Typically, database servers provide an interface for executing functions during run time in response to particular events, and for maintaining a record of processed queries. Such functions may be triggers, during execution of which other database activities are suspended, or may be callback functions, execution of which does not hold up processing of the database queries. Trace data, not available through the database transaction log, and data collected by the callback functions may also be used to create a data audit trail. A combination of the transaction log and trace data may provide information about all data accesses.

A database audit may be performed by collecting data from the transaction log and trace, exporting the collected data into a repository, and analyzing the data in the repository. The repository data may also be used to create reports, such as, for example, reports of data modifications or revision histories for a particular user. Alternatively, reports of database activities by particular users may be created.

In addition to generating reports, the repository data may be used to provide access, through a user interface, to users for exploring and monitoring of database accesses. Such user interfaces may be in the form of a web user interface, or in the form of a database exploring application.

The activity information from the audited databases may be collected by the collection agents. The collection agents may ensure continuity and non-overlap of the collected data. Such continuity may be maintained, for example, by using database checkpoint markers to delineate separate collection processes. The collection processes may be run at the predetermined intervals, or may be started by a user from a management console.

The data from the transaction log may be collected using rollback techniques. The transaction log data may be correlated with the collected trace and callback data. Such correlation may be accomplished, for example, by using information relevant to session establishment, such as System Process ID (SPID) and times of the logins. The information relevant to the session establishment, as well as information about other commands, may be collected as part of the trace data.

Information about SELECT commands may also be gathered as part of the trace data. Such data may later be analyzed to determine who viewed which database tables or records. A reconstruction of a portion of the database may be required in order to determine which data was viewed because the data in the production database may have changed since the time of the execution of a particular SELECT command.

In addition to collecting the audit data, the database audit system may issue alerts in response to a set of events at the database server. Such events may include, for example, database structure-changing commands, or other events relevant to the security of the system, as determined by a system administrator.

The database audit system may be employed on several databases, where the databases audited may be of different types, for example, SQL Server and Oracle databases. The audit information from the different databases may be stored in the same repository and may be analyzed later without regard to which database it came from.

Logical keys may be used to identify database records. Logical keys may be a column or a combination of columns uniquely identifying records. The user may later browse record revision history for a particular record based on its logical key. In addition, logical keys may be used to organize the audit reports.

The audit reports and data in the repository may be monitored to detect anomalies. Such anomalies may be, for example, a large number of accesses that resulted in permissions being denied, a change in data access patterns over time, etc. The audit data may be used to establish patterns, and may later be tracked for deviation from those patterns. The process of detecting anomalies may be guided by a set of rules expressed by the user or built into the system. Analyzing the repository information for anomalies may be accomplished by using techniques known in the art, including, for example, statistical modeling, data mining, and machine learning.

The database audit system may be modified by one skilled in the art using a management console. The management console may provide a user interface for setting up databases and tables for auditing, which events should be kept in the trace history and which should be filtered, in which repositories the audit trail data should be stored, etc. The database audit system may be implemented across multiple platforms, operating across a local network or across the Internet. Various details of the database audit system may be modified by one skilled in the art according to the purpose of the particular embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 7 is an illustration of a collection table schema;

FIGS. 8*a*-8*b* are illustrations of using SELECT operations to create a data audit trail;

DETAILED DESCRIPTION OF THE INVENTION

Figure 1:
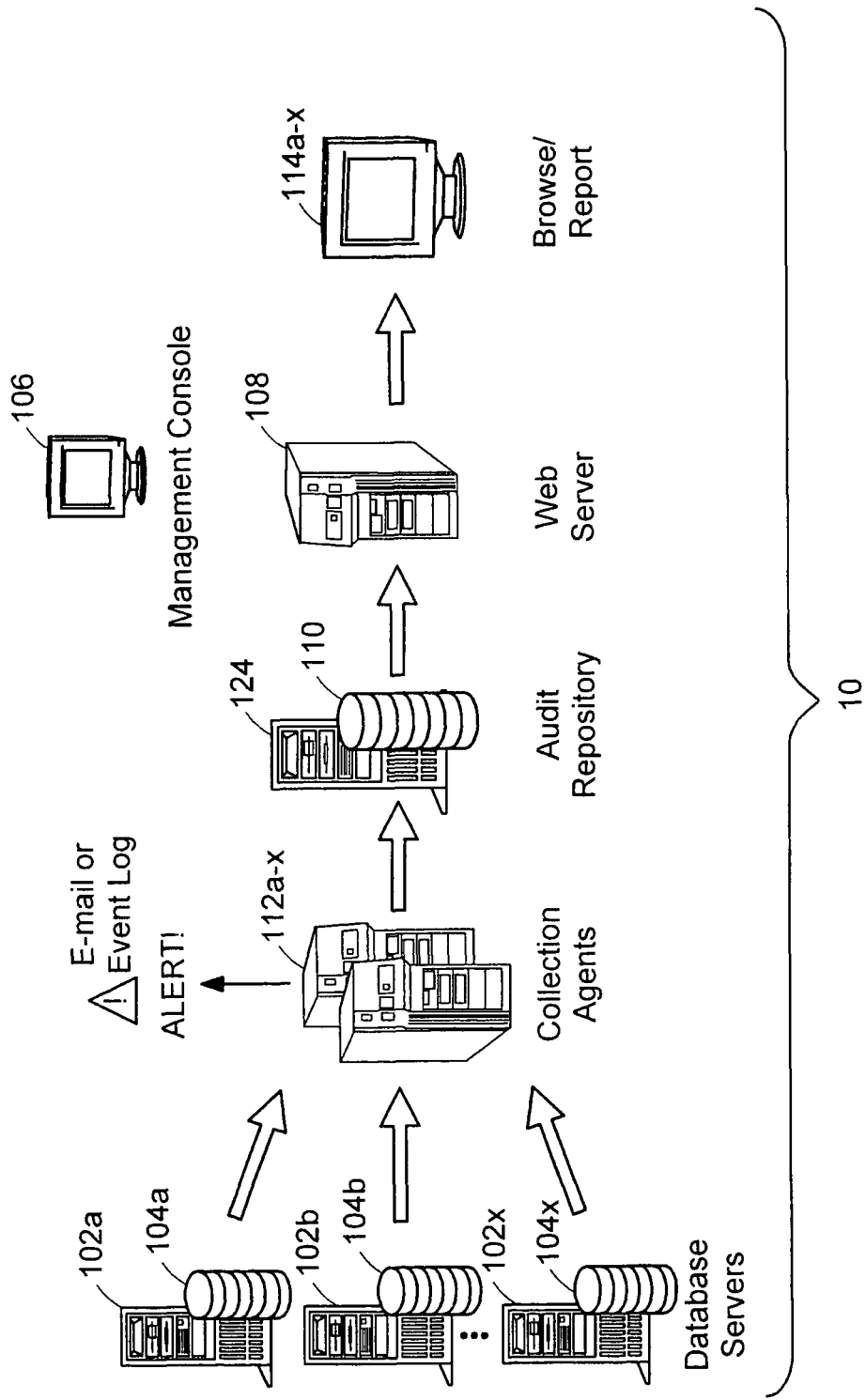
FIG. 1 is a schematic diagram of a data audit system according to one embodiment of the invention.

Illustrated in FIG. 1 is a data audit system that provides a number of capabilities: capturing a record of data access and permissions changes, managing the captured information for lengthy periods, flexibly analyzing the information, producing reports, and detecting conditions of interest for timely notification. "Data audit", as used herein, refers to keeping track of changes and access to the data for any reason, and not only for the official audit purposes. Data accesses include both data accesses for modification and for viewing.

Data to be audited is stored in databases 104*a-x* located on corresponding database servers 102*a-x*. Collection agents 112*a-x*, each corresponding to one or more databases 104*a-x*, are tasked with collecting and organizing information about data accesses and changes in database structure. Collection agents 112*a-x* capture data accesses: that is, they automatically track and record audit information whenever data is modified or viewed by any means on the target databases. Tracking may be performed on a periodic or as-needed basis. In one embodiment of the invention, the granularity of data tracked may be configured by a system administrator, while in another embodiment of the invention, the granularity of data tracked may be adjusted automatically by the collection agents 112*a-x*.

In addition to capturing data accesses, collection agents 112*a-x* may automatically track changes both to the permissions that control data access and to database schema to ensure ongoing integrity of the structures storing data and to correlate activities such as logins and logouts with data stored in the database transaction logs.

Collected data audit information, along with records of all changes, is stored in a single logical audit repository 110, which may itself consist of multiple physical databases stored on multiple servers 124. In such a way, captured information is automatically collected from multiple databases into the easily managed long-term repository. In an alternative embodiment of the invention, there may be multiple repositories 110, logically divided based on the type and/or source of the audit trail information located in them, or based on any other factors, as determined by one skilled in the art.

Once the audit information is stored in the repository 110, it may be accessed through a web server 108 by clients 114*a-x* that can browse the audit trail and/or order or view automatically generated and custom reports. Web and other user interfaces on clients 114*a-x* provide a way for processing the stored information to identify activities of interest. Ad hoc and periodic exporting of analysis results in a variety of formats may be provided in one embodiment of the invention, allowing for display, printing and transmission of audit information. The data in the repository 110 may be accessed directly as well, either through standard database-access tools, or through proprietary access mechanisms.

Setup and management of the system 10 may be performed from a management console 106, which allows system administrators to configure auditing of all of the target servers, and specify the activities of interest, the repository for managing the information, and the schedule for transferring data. In another embodiment of the invention, automatic monitoring for conditions of interest and generation of selected alerts may be set up along with the regular auditing activities.

Figure 2:
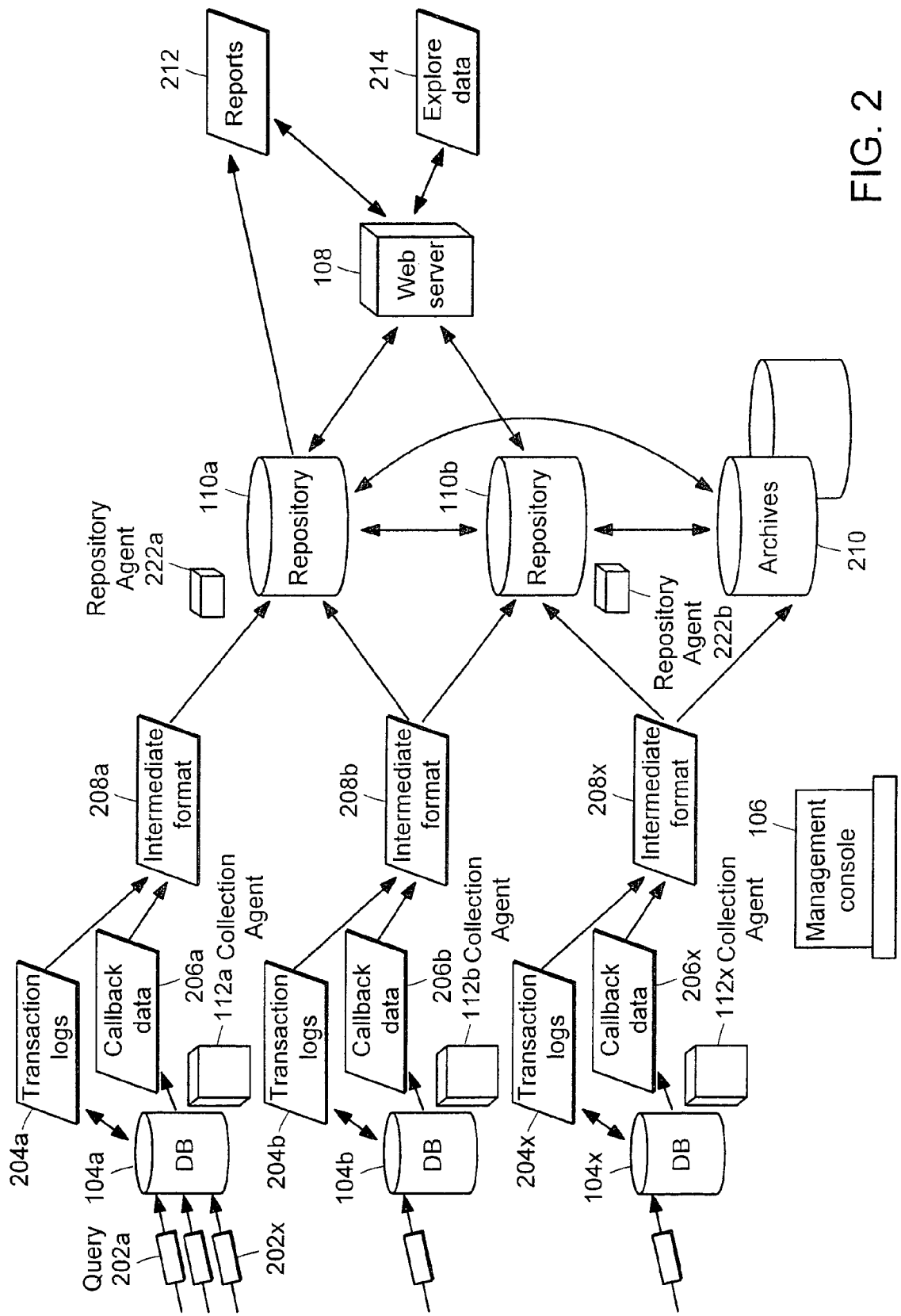
FIG. 2 is a data flow diagram for the data audit system.

FIG. 2 is a data flow diagram illustrating movement of data inside the system 10. Transfer of the data may be accomplished using system communication devices or through a network, employing network protocols known in the art.

Queries 202a-x arrive at databases 104a-x. Queries 202a-x may be Data Modification Language (DML) commands, inserting, deleting or modifying data in the database. In addition, queries 202a-x may include Data Definition Language (DDL) commands to modify the database schema or the database structure. Queries are processed at databases 104a-x. In processing the queries, commercial databases (e.g. SQL Server, Oracle, DB2, Sybase, etc.) typically employ transaction 204a-x to keep track of modifications to the data. A transaction log is a file that records all changes to user and system data. Transaction logs are described in further detail in U.S. patent application Ser. No. 09/861,830, incorporated herein by reference in its entirety.

The transaction logs are used as a master record of alt changes to the data; they can be employed to recover data in the database in case of a fault, and can be archived to provide backup data. Before a data-modification action is executed on a database, a record of that action is written to a transaction log, such that if there is a fault during the execution of the action, the database can later be brought into a consistent state using the transaction log. Transaction logs 204a-x for each database 104a-x are typically stored on the same machine as that of the corresponding databases 104a-x; however, in an alternative embodiment of the invention, transaction logs may be stored on a separate machine. Transaction logs 204a-x may include Undo and Redo logs or other data logging structures, as implemented by one skilled in the art. Data from transaction logs 204a-x may be gathered by the collection agents 112a-x for the audit trail.

In addition to transaction logs 204a-x in processing queries 202a-x, databases 104a-x may generate callback data 206a-x, consisting of data collected by executing predetermined functions in response to predetermined sets of conditions. Callback data may also include trace data, collected by tracing certain server events, that is, recording the events and their results In one embodiment of the invention, the trace data may be collected, for example, from SQL Server database server using the Profiler interface. Each trace that is executed may contain information about the event that is being profiled, how the results should be presented, and what data should be included in the trace. This trace information—events, data columns, and filters—describes what a SQL Server Profiler trace may capture in one embodiment of the invention. Events are incidents that cause the SQL Server Profiler to display an entry. Data columns determine what the trace stores in an entry. Filters determine the criteria (other than the occurrence of the event) that an event must meet before the SQL Profiler makes an entry. In an alternative embodiment of the invention, a similar profiling interface on an Oracle server may be employed. In yet another embodiment of the invention, the trace and callback data may be collected using other interfaces designed for that task. In yet another embodiment of the invention, data sniffing code may be integrated into a database engine. In yet another embodiment of the invention, the trace data may be collected by directing the database engine to store such data in a file or a database table, from which the trace data is then collected.

For each database 104a-x, the data from the transaction logs 204a-x and the callback data 206a-x is collected by collection agent 112a-x, which, in turn, converts the collected data into an intermediate format 208a-x, which can be transferred to repositories 110a-b. Repositories 110a-b may be a set of database tables, for example, SQL tables. A single repository 110a may contain audit data from one or many databases. The repository 110a may reside on the same machine or SQL instance as the database being audited or on a separate machine/instance. In an alternative embodiment of the invention, database language other than SQL may be used. In yet another embodiment of the invention, repository 110a-b may be implemented as file systems, proprietary storage systems, or any other data storing mechanism as known in the art.

Repository agents 222a-b receive intermediate files 208a-x and store them in repositories 110a-b. In addition, intermediate format files may be stored by the repository agents 222a-b in archives 210. Archives 210 may also store data from repositories 110a-b, providing backup copies in case of a fault in one of the repositories 110a-b. In an alternative embodiment of the invention, intermediate files 208a-x may be compressed and/or encrypted for transferring to repository agents 222a-b.

Data from the repositories 110a-b may then be sent to web servers 108 in response to queries. The web servers 108, in turn, send the data received from repositories 110a-b to users in the form of reports 212 and data for user interface, providing exploration capabilities. Access to the repository data is not limited to that from the web servers 108 and may be accomplished by separate database exploration applications.

Repository data perusal may be viewed and managed through interactive reports, scheduled reports and custom reports. The data management functions are not limited to these three, and may be augmented as deemed necessary by one skilled in the art.

Interactive reports allow users to create and dynamically revise reports using the web user interface (not shown). This graphical web-based application enables users 114a-x to view, sort and filter audit information and produce reports. Data for the web user interface is provided by the web server 108.

Scheduled reports can be scheduled to run automatically at regular intervals using schedulers available on the client machine, such as, for example, the Windows scheduler. In one embodiment of the invention, such reports can use as default the configuration from the previous interactive report performed by the user.

Custom reports allow users to interface directly with the data in the repository, either by running queries through a database query interface, such as, for example, SQL Server Query Analyzer, or using a third-party report creation application. Alternatively, a report creation capability may be embodied in a system component provided with the repository.

Control of the data flow and system functions may be accomplished through the management console 106. The management console 106 is a tool that allows system managers to set up and configure the system 10 environment and monitor the collection history. For example, management console 106 may provide interface to define objects, such as databases, tables, and columns, that need to be audited, create repository servers 124, repositories 110 to contain audit data, and create alerts for particular database activity types, as well as assign notification methods to these alerts.

Figure 3:
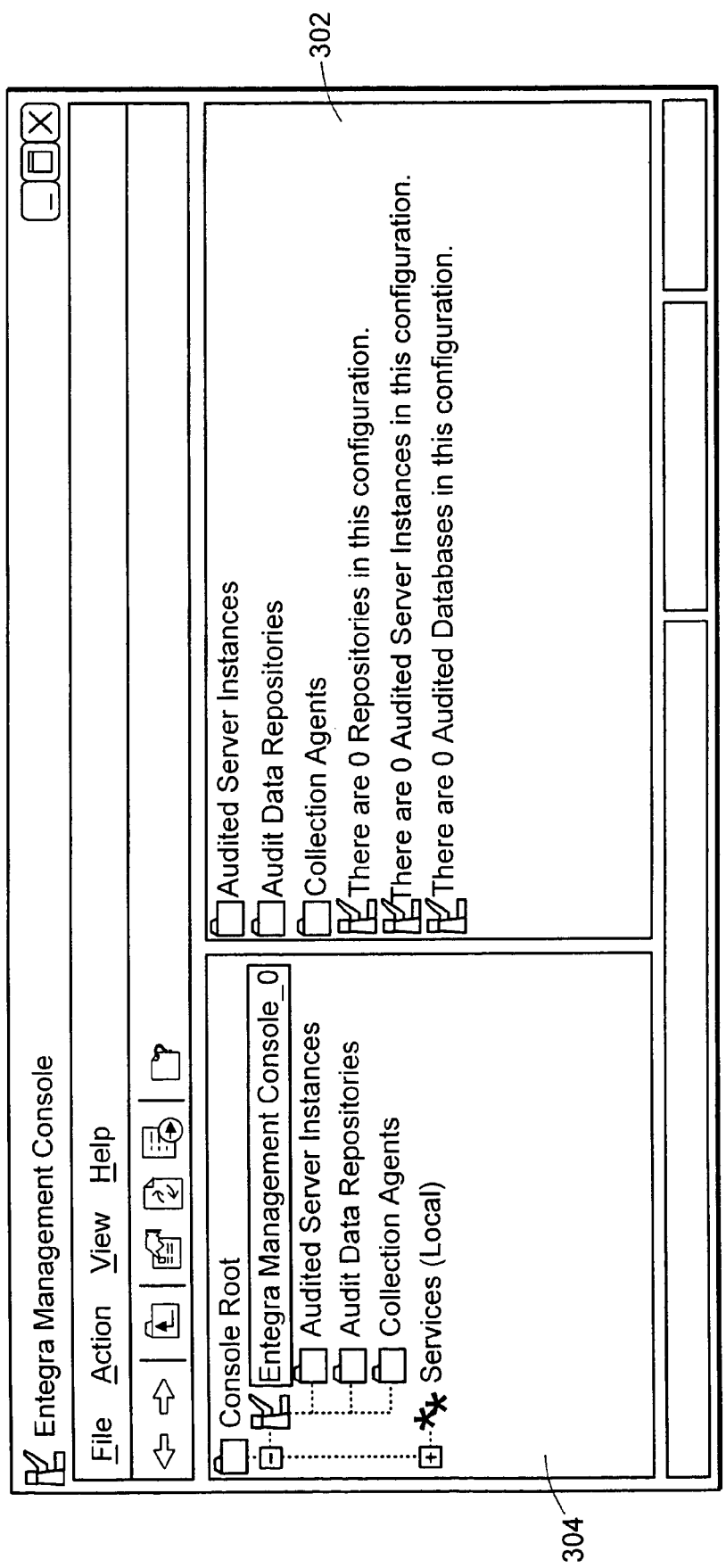
FIG. 3 is an illustration of a user interface for a management console.

Illustrated in FIG. 3 is a user interface 302 for the management console 106. User interface 302 provides hierarchical view 304 for choosing to view particular sections of the system 10 and explore those sections in further detail.

Management console 106 may provide several interfaces—referred to as "wizards"—that facilitate configuration of the system 10. Such wizards may include, for example, Add Audited Server Instance wizard, Add Database wizard, Add Repository Server Instance wizard, Add Repository wizard, and others.

Management console 106 may be running on a single machine or on a cluster of machines, and may consist of multiple modules or a single application, as implemented by one skilled in the art. In an alternative embodiment of the invention, the management console 106 may come pre-configured with presets appropriate for a particular application of the system 10. For example, granularity of the collected data may be pre-configured based on the kind of data to be stored in the databases 104a-x.

Figure 4:
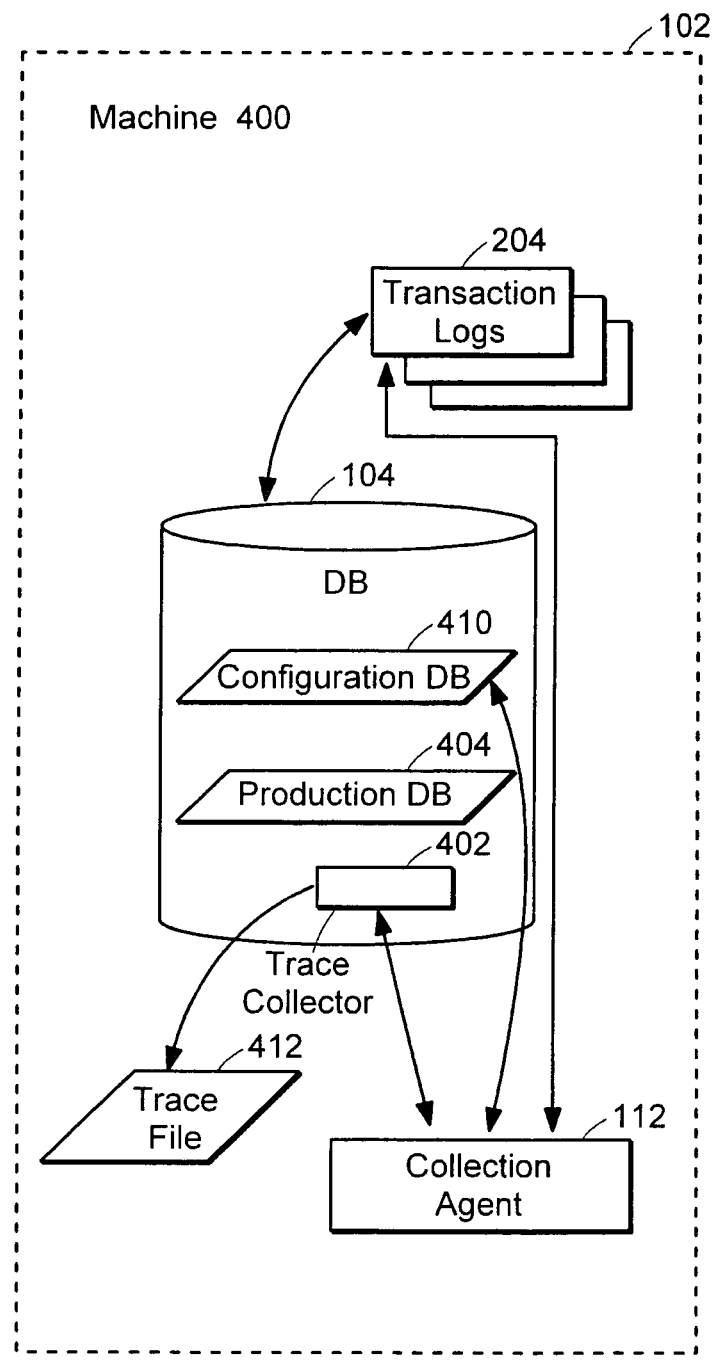
FIG. 4 is a schematic illustration of a machine housing a database server.

Each database server 104 may be located on multiple physical machines or on a single machine 400, as illustrated in FIG. 4. Typically, located on the same machine are transaction logs 204, as well as the collection agent 112, responsible for data collection for database 104.

The database server 104 itself may contain multiple databases, such as, for example, configuration database 410, storing configurations for the database server as well as for the collections agent 112, and production database 404, storing actual data being audited.

Database server 104 may provide capabilities for executing certain functions in response to a particular command sent to the database. The results of executing these functions are referred to as "traces" and the task of collecting them is performed by the trace collector 402. Traces may be collected in response to critical commands, such as, for example, logging in and logging out of the database, changing the database schema and, changing the database structure. Some of these commands may be sufficiently critical to maintaining the integrity or security of the database that an alert may be generated in response to those commands. The alert may be sent to the system administrators or a database administrator, notifying them of the performed operation. The alert may be sent by e-mail, telephone service or any other means known in the art.

In addition to monitoring commands changing the structure of the database, trace collector 402 may be used to monitor who views data and what data is being viewed. View data commands are typically referred to as SELECT commands. Operation of the trace collector 402 in response to SELECT command is illustrated further in FIGS. 8a-8b.

In an alternative embodiment of the invention, trace data may be collected by packet sniffing on the network on which the database server 102a-x is located: by capturing and processing the queries sent to the database server 102a-x, the collection agent 112 may be able to gather information about executed commands related to viewing data, session establishment, and changing database structure or schema.

Collection agent 112 can gather data both from transactional logs 204 and traces collected by the trace collector 402, thus ensuring continued data auditing and wide scope of the audit trail that may encompass everything that happened to the data and the database. The resulting audit trail may contain a complete record of changes and be capable of showing the entire history: who made requests to change or view data and which data was requested.

Collection agent 112 may also be configured to specify which tables, items and instances of data have to be audited. Filtering may be applied at the collection agent 112, such that irrelevant data is filtered out and is not collected. Collection of trace and transactional data may happen automatically at predetermined times, for example, every hour. In between the collection times, data modifications are stored in the transaction logs 204 and trace data is stored in a trace file 412.

As discussed above, collection agent 112 may be physically located on the same machine 400 as the database server 104, or may be located on a remote machine, accessing the database server 104 through the network. The number of collection agents deployed need not correspond to the number of database servers running because a single collection agent may service multiple database servers.

Figure 5:
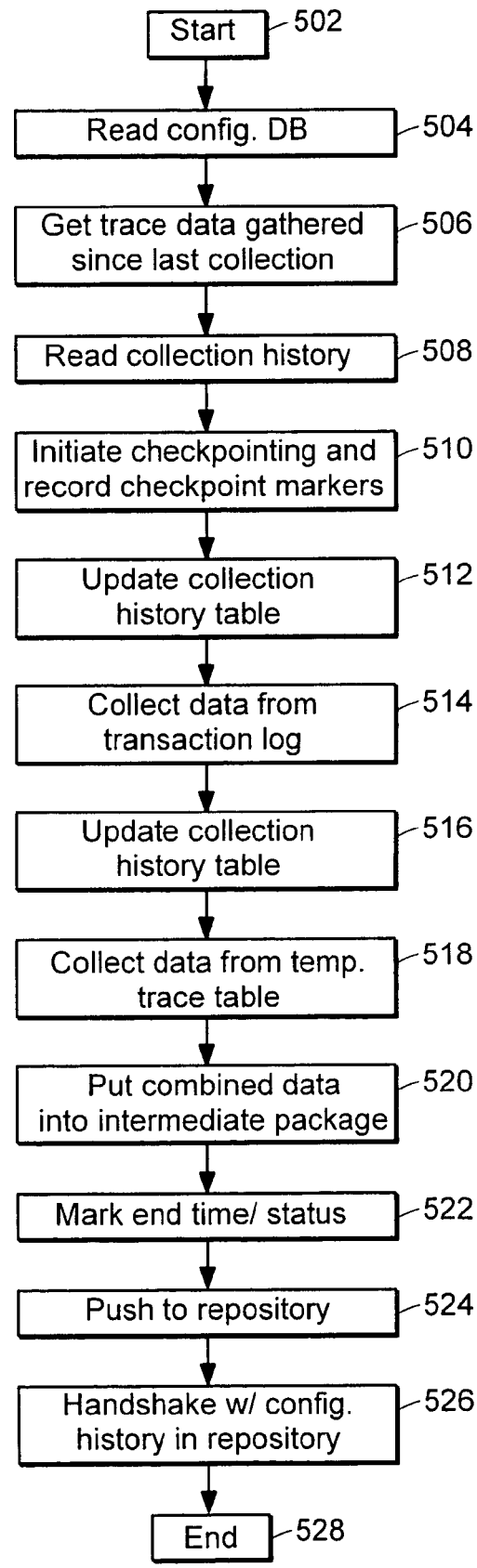
FIG. 5 is a flow chart illustrating operation of data collection process executed by a collection agent.

FIG. 5 illustrates operation of the collection process performed by a collection agent 112. When the collection agent 112 launches, either in response to a manual command or as part of a scheduled task, it first reads its configuration information. Such configuration information may be stored, for example, in the Windows registry of the machine on which the collection agent 112 is running. In an alternative embodiment of the invention, the configuration information for the collection agents 112 may be stored in a central database or some other file, or be requested from the management console 106. The configuration information tells the collection agent 112 which server instance(s) it is responsible for and how to contact and log into each audited server instance. The collection agent can then launch a collection process for each audited server instance.

The information about each audited server instance, including which databases to audit and which tables and columns within that database to audit, may be stored on the server machine itself. The collection agent reads this configuration information upon connecting to the audited server instance. Keeping this information on the audited server rather than on the collection agent's machine allows for management of the audited server instance from multiple locations and ensures preservation of the audit configuration in the event of a cluster failover or other problems.

The following types of data can be harvested by the collection agents 112a-x:

Data Modification Language (DML) operations
Data Definition Language (DDL) operations
Data access information (SELECT commands)
Transaction information
Session information
Security events As used herein, database schema changing commands include commands for creating, modifying and/or deleting tables and table structure, while the term "database structure changing commands" includes any other commands modifying structure of the database, for example, security-related commands such as modifying access permissions.

The collection process starts in step 502, after which the collection agent 112 reads configuration database 410 in step 504. Configuration database 410 may include a collection cable (see FIG. 7) containing collection history and indicating which data has already been collected.

In step 506, the collection agent 112 can gather trace data collected since the last collection time. This trace data may be collected from the trace file 412 from additional storage provided by the database server 104 itself.

The collection agent 112 then proceeds to read the collection history in step 508. Typically, collection of data from the transaction log 204 may be delineated by recordation of the checkpoint markers. Checkpointing is a process performed periodically on the database server 104 to ensure that identical data is stored in the production database 404, transactional logs 204 disk drives, and any additional storage. If it were not for the checkpointing process, at times different data may be stored in those places because of inherent features of having to write data to multiple locations.

Checkpointing may be performed automatically by the database server 104, but it may also be initiated by outside agents. The collection agent 112 initiates checkpointing on the database in step 510. Each checkpoint is recorded in the transaction log 204 using a checkpoint marker. The checkpoint marker is typically a unique number, identifying the checkpoint, and the time at which the checkpoint was performed. The checkpoint markers may be used to keep track of which data has been collected from the transaction log 204. By recording checkpoint markers in the collection table, the collection agent 112 makes sure that it collects continuous and not gapped or overlapping data.

The collection agent 112 then updates the collection history table in step 512 to store data about the current collection process, such as, for example, import start time, and data start checkpointing marker, as well as current status of the collecting process.

Data from the transaction log 204 is collected in step 514. The process of collecting the data from the transaction log 204 is discussed below in connection with FIG. 9.

Once the data from the transaction log has been collected, the collection history table is updated in step 516 to record the import end time and any other additional information, such as, for example, status information.

Additional data may then be collected in step 518 from the temporary trace table 412. Trace and transactional data are combined into an intermediate package in step 520, after which the collection agent 112 marks end time and status of the collection in the collection table in step 522.

The intermediate file 208a-x is sent to the repository agent 222 on the repository machine in step 524. The status of transferring the intermediate file 208a-x may be recorded in the collection table as well. The collection table is set up in such a way that if any of the operations performed by the collection agent, including transferring of the data to the repository agent, fail, the next time that the collection process is run, the collection agent 112 will collect all data that has not been fully collected in the previous collection.

When transfer of the intermediate file 208a-x to the repository 110a-b is complete, the collection agents 112a-x handshake with the repository agent 222a-b at 526 to transfer control over the intermediate file 208a-x. After the intermediate file 208a-x is transferred, the collection process is complete at 528.

Importing data into the repository 110a-b is performed by the repository agent 222a-b. In one embodiment of the invention, the repository agent 222a-b runs as a service on the repository machine. After the intermediate file 208a-x is received from the collection agent, the repository agent 222a-b extracts the data from the intermediate file 208a-x and uses it to populate the repository 110a-b. After importing is complete, the data is ready to be viewed and queried. The intermediate file 208a-x may also be stored on the repository machine or in the archive 210.

Figure 6:
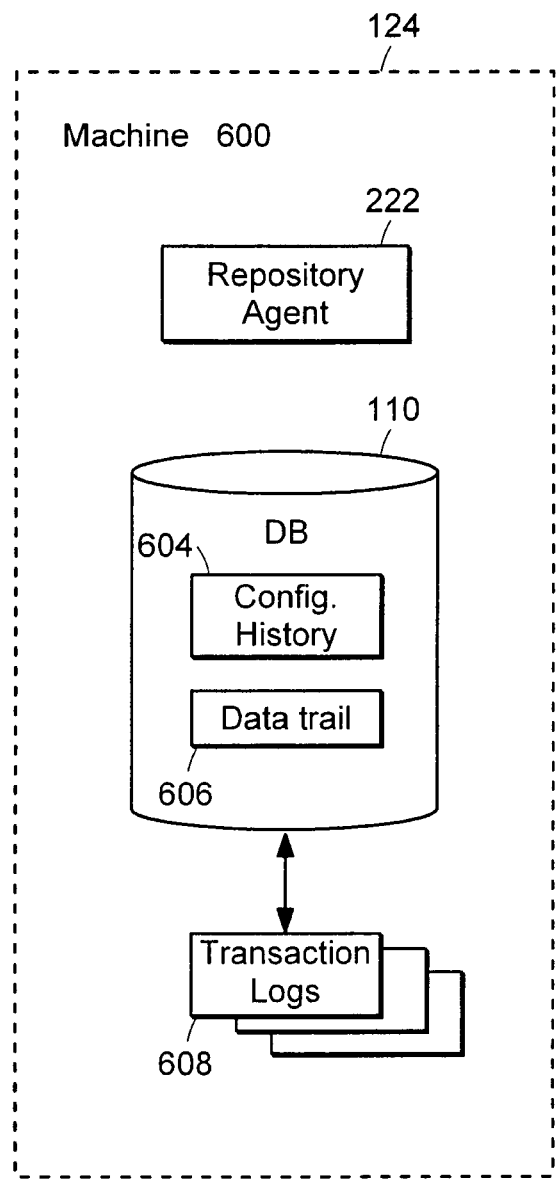
FIG. 6 is a schematic illustration of a machine housing a repository server.

FIG. 6 illustrates a machine housing a repository server 110. As with the database server 104a-x, the repository server 110 may be housed on a single machine or on multiple physical computers. There may be more than one repository, referred to jointly herein as repository server 110. The server 110 may serve two databases: a configuration database 604 and a database containing the audit trail data 606.

The repository agent 222a-b may be located on the same machine as the server 110. A single repository vent 222a-b may service multiple repository servers 110 or multiple instances of one server. In an alternative embodiment of the invention, the repository agent 222a-b is located on a separate machine and communicates with the database server 110 through the network, thus making the performance load tighter for the machine 600.

Repository server 110 may have its own transaction logs 608, used to preserve integrity of the data trail database 606. However, these transaction logs 608 are more of a feature of the repository being a database, rather than a requirement of the system. In an alternative embodiment of the invention, the repository database 606 may be implemented as a file system.

The archive 210 may be used for housing audit data as determined by the system administrator. Such data may be arranged, for example, for copying onto more permanent storage medium, such as, for example, backup tapes. The management console 106 may be used to set up preferences for archiving of data in the archive 210. In one embodiment of the invention, the system administrator may set the date ranges for data stored in the archive 210. In another embodiment of the invention, the system administrator may use the management console 106 to set up filters for the audit data to be stored in the archive 210. Such filters may be based, for example, on specific tables and databases, as well as the kind of data to be stored, such as, for example, information about who modified data in the databases or who viewed which data in the databases. The archive 210 may itself be one or multiple databases with their own recovery mechanisms.

FIG. 7 is an illustration of a collection table schema employed to keep track of which data has been collected and which is yet to be examined. Illustrated is a collection table 702 as it would be stored in the configuration database 604 in the database 104a-x. A similar table might be stored in the configuration database 410 in the repository database 110, although there may be differences in some of the fields used. Generally, fields such as row ID 704, data start marker 706, data end marker 708, import start time 710, import end time 712, status 714, and file name 716 are employed to keep track of the collected data; however, additional fields may be necessary, depending on the particular embodiment of the invention.

Row ID field indicates the unique number of the record for a particular collection. Data start marker may be indicated by a checkpoint marker from the transaction log. For example, in record 718, data start marker is 1.2.3—the checkpoint marker from which the data is to be collected. Likewise, import start time field 710 indicates when a particular collection process starts. Status field 714 is used to indicate the current status of the collection process. As shown at the bottom of FIG. 7, status field can take on a variety of values, including indication of the current stage of the collection process and whether the previous stage has completed. Data end marker 708 and import end time 712 fields, as well as file name field 716, are used to keep track of the collected data and as a reference for the beginning of the next collection.

The collection process is organized such that if a particular stage of the process fails, it will be repeated or recovered at the next execution of the collection agents 112a-x to ensure that there are no gaps in the collected data. For example, record 720 illustrates a collection that does not have all the fields filled in, and the status is "collecting" instead of the expected "OK". Therefore, when the next collection process starts, it will have to collect the data that was not collected by the previous process. As indicated in the record 722, the next collection process will have to collect the data from data start marker 1.2.4 through whatever the current data marker is, which, as indicated, is 1.2.6. Similarly, if the data collection process fails during writing collected data to file or during transfer of the intermediate format the 208a-x to the repository agent 222a-b, the next collection process will have to repeat those steps. Only when the repository agent 222a-b has indicated that it received the intermediate format file 208a-x dues the control over the process turn over to the repository agent 222a-b and the collection process is deemed to be complete.

As discussed above, collection agents 112a-x collect not only data from the transactional logs 204a-x, but also callback data 206a-x. Typically, transaction logs 204a-x do not keep track of who viewed which data, only of which data was modified. Therefore, additional information is necessary to create the audit trail about the data viewing activity. Such additional information may be obtained by using callback features of the database.

In one embodiment of the invention, the database 104a-x is configured to execute a callback upon receiving a data viewing query. Such function may, for example, write to a file information about the received query. Database viewing is typically accomplished using a SELECT command. Illustrated below are examples of using the SELECT command.

(1) Select * from Table A
(2) Select * from Table A where ones 'a'
(3) Select * from Table A where three='3'

The commands (1), (2), and (3) may be applied to exemplary Table A illustrated in FIG. 8a. For example, command (1) requests all entries from the Table A. Command (2) requests to view those entries from Table A where column 1 is equal to "a". In the example shown, record 808a will be returned in response to the command (2). Command (3) requests only the second column of those records where the third field is equal to "3". As illustrated, only the value "2" will be returned in response to this query.

Figure 8B:
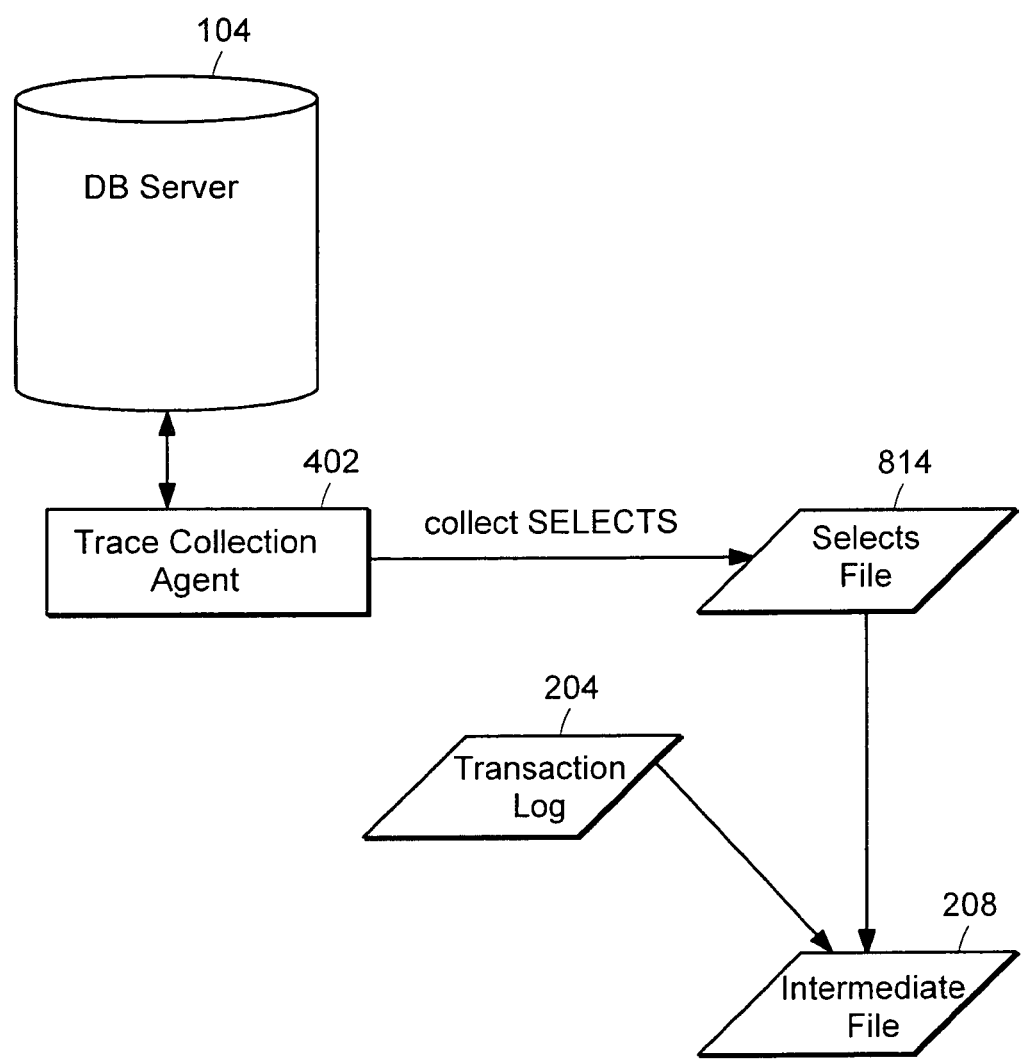

SELECT commands may be used to record and analyze data viewing operations. Collection and processing of SELECT commands is illustrated in FIG. 8b. SELECT commands data is collected from the database server 104a-x by the trace collection agent 402. The trace collection agents 104a-x may be, for example, a server component that implements extended storage procedures that capture a particular set of events. The events captured may be all events that require permissions check on the database. The permissions check is an operation that is run any time an application or a user attempts to modify or view data, perform database structure-changing operations, or other commands, such as, for example, "log in" or "log out" operations. The database server 104a-x sends permissions check events to the Trace Collection Agent 402.

This data will be stored in the trace data file 814 and, eventually, will be transferred to the repositories 110.

SELECT commands may be used to record and analyze data viewing operations. Collection and processing of SELECT commands is illustrated in FIG. 8b. SELECT commands data is collected from the database server 104 by the trace collection agent 402. The trace collection agent 104 may be, for example, a server component that implements extended storage procedures that capture a particular set of events. The events captured may be all events that require permissions check on the database. The permissions check is an operation that is run any time an application or a user attempts to modify or view data, perform database structure-changing operations, or other commands, such as, for example, "log in" or "log out" operations. The database server 104 sends permissions check events to the Trace Collection Agent 402.

Records of the permission check events may also include an indication of which operation (SQL statement) called for the permission check, along with information about who requested the operation, and what data was returned in conjunction with it. For example, in response to a SELECT command executed on the database, the trace collection agent 402 may receive a record of the SELECT command, as well as whether the permissions check succeeded—that is, whether the data viewing operation was permitted. In addition, the collected information may include a table ID for the database table that was affected by the operation.

Collected SELECT commands and associated information are stored in SELECTS file 814. SELECT commands may be analyzed to retrieve information about database data viewing accesses. The information from the SELECT commands may be used not only to show who viewed the data in the database, but which data was viewed. This later analysis cannot be accomplished simply by looking in the current database 606 for the appropriate record and field names, because the information in the database 606 may have changed since the time the SELECT command was executed. Therefore, what is recorded in the repository server 110, in addition to the exact command executed, is the data that would have been viewed in response to this command. In some cases of the SELECT commands, such information may be obtained from the record of what a database looked like at that time and the SELECT command itself by using the record IDs to look up what those records contained at the time of the execution of the command.

In one embodiment of the invention, the WHERE clause of a SELECT command may be parsed to determine which records were accessed by this command. In the majority of cases, the WHERE clause contains identifiable information of the accessed records—that is, by parsing the WHERE clause, logical keys for the affected records may be found. For example, for commands (1) and (2), it would be sufficient to look up what records were viewed if column 1 is used as a unique ID for each record. The unique ID for each record may be automatically determined by the system 10. In one embodiment of the invention, a unique ID for each record is referred to as a "logical key". The logical keys are discussed in further detail below in connection with FIG. 12 Storing information about changes in each record is described in further detail in connection with FIG. 12.

In order to obtain the audit trail not only about who viewed database data, but also which data was viewed, a SELECT command may be run against the database again and the resulting output may be recorded. For example, command (1) may be re-sent to the database server 104a-x by the trace collection agent 402 in order to obtain and record the return data (because SELECT commands represent data viewing, repeating those commands does not affect the state of the database).

It is possible that the data in the database has changed between the time the original SELECT command was performed and running of its duplicate. In those cases, data from the transaction log 204a-x may be used to locate any pertinent data modifications and associate the pre-modification data with the SELECT command.

The majority of SELECT commands typically include the indication of the logical key as viewed in the command itself. For example, if field one is defined to be the logical key field for the table A, in command (2), "a" would be the indication of the logical key affected by that command. However, as shown in command (3), that is not the case with some commands. For those commands, repeating the SELECT query may also result in obtaining the data that was viewed. Obtained database records may then be parsed to determine logical keys.

Some of the data collected from the SELECT command may be incomplete. For example, the user may be indicated by the System Process ID (SPID), rather than the user name. To supplement this information, records of other commands may be used. For example, records of the login and logout commands may be kept. An example of the information that may be collected from the login command 816 is illustrated below.

Login:
   Time=12:00
   SPID=1
   USER=dbuser
   Computer=management-console
   App=Query Analyzer The login command shows a system process ID and the user name for the user accessing the database. Using this information, as well as the login time, it may be possible to reconstruct who made which SELECT queries even though the system process IDs may not be unique over time, as long as they are unique at any given time.

For example, when a user logs in, a session may be established for that user, and the SPID may be assigned for the application performing the login. If the user (through the application) then proceeds to modify data, records of those modifications will be written to the transaction log, each of the modifications associated with that SPID. Later, the collection agents 112a-x may associate data modifications with the user that performed it by correlating the SPIDs from the transaction log records with the SPID recorded during the session establishments.

The user may also proceed to view data, and the information about that will be recorded by recording trace data containing SELECT commands. Once again, the SPID captured with the SELECT command may later be used to associate the record of the data viewing with a particular user. Furthermore, the user may also perform (or attempt to perform) database structure-altering commands, such as, for example, deleting a table in the database. In some cases, it may be prudent to issue an alert to a system administrator if such commands are attempted in order to prevent unauthorized data tampering.

The events that trigger the alerts may be predefined by the system administrator using the management console 106. Such events may be not only database structure-altering commands, but also commands that do not pass authorization, for example, failed logins. After the user completes database accesses, a LOGOUT command may be executed, ending a particular session. The SPID is released upon the execution of the LOGOUT command and may be later reused. A particular session is defined, therefore, by a SPID and a session establishment time. In an alternative embodiment of the invention, session completion time may be recorded as well and an alert may be issued if a command is attempted by an application bearing the SPID that is not currently active—that is, if a session has not been established for that SPID.

In an alternative embodiment of the invention, those types of commands not containing unique IDs or the logical keys may be analyzed by reconstructing the whole database as it was at the time of execution of the command and applying the query to the reconstructed database.

Users may enable or disable SELECT auditing on the database or table level. The configuration information is stored in the configuration database 206a-x on the audited server instance 104a-x. The user interface for this configuration may be a check box in the management console 106. The present invention is not limited to using the SQL database programming language, and any other language may be used. In an alternative embodiment of the invention, collection of the data viewing information may be accomplished using other database engine interfaces.

In yet another embodiment of the invention, the transaction log may contain records about the database viewing and the information about who viewed what data for the audit trail may be collected from the transaction log.

The data for the reconstruction of the databases and for keeping track of which data has been changed is collected from transaction log 204a-x. The transaction log is a rich source for building an audit trail for data modifications. This is due to the fact that any change made to any data record stored in the database may be logged directly to the transaction log before being written to the data file This means that the database server 104 is already capturing a large portion of the data that is needed by system 10 to build its audit trails.

Collection agents 112a-x capture DML events from the transaction logs 204a-x. Essentially, this consists of all INSERT, DELETE, and UPDATE events executed against the database 104a-x during the given period of time. Column level change details are captured for each event.

Figure 9A:
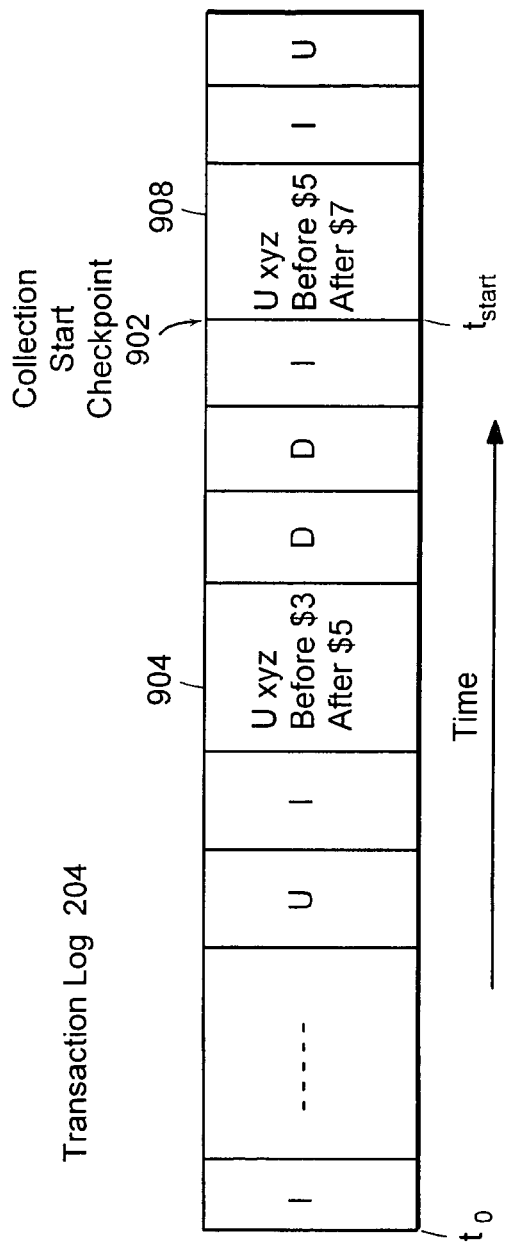
FIGS. 9*a* and 9*b* are illustrations of collecting the audit data from a transactional log.

Shown in FIG. 9a is a simplified representation of a transaction log 204. Executed commands are indicated by abbreviations I, D, U, for INSERT, DELETE, and UPDATE, correspondingly. Also, each event has a time stamp and is associated with the SPID (not shown) of the application that executed it. The time stamp and SPID are used to correlate the DML events with a particular application session.

The data may be collected from both online and backed up transaction logs 204 associated with the database 104a-x. The coordination with the transaction log backups may be arranged by allowing a user to specify a directory location to which transaction log backups are to be made (or copied). A system administrator can configure the system 10 to delete or move backed up transaction logs after it has collected data from them.

In general, log records associated with INSERT, DELETE, and UPDATE contain the detailed column level data changes. For INSERTS and DELETES, the row column data in the transaction log record represents the entire data row that was inserted into or deleted from the database. This data row can be parsed into the individual column values with knowledge of the internal data row structure and the table schema.

However, in some commercial databases, for example, a SQL Server, transaction log records associated with UPDATES do not contain information about the unique ID for the data row being modified. The unique ID may be a physical attribute assigned by the database itself. The unique ID may be used to manage the data and may later be parsed out and correlated with logical keys. The column data row may be represented as a binary delta between the before and after row values. Because of this logging approach, modified column values cannot be interpreted directly from the transaction log records in a meaningful way.

The solution to this problem is reconstruction. Reconstruction is a process by which system 10 finds a base row value for the data record in question (usually the current full row from the database), and does a "rollback" on that base row to generate the data row as it was at the time the update was applied.

Figure 9B:
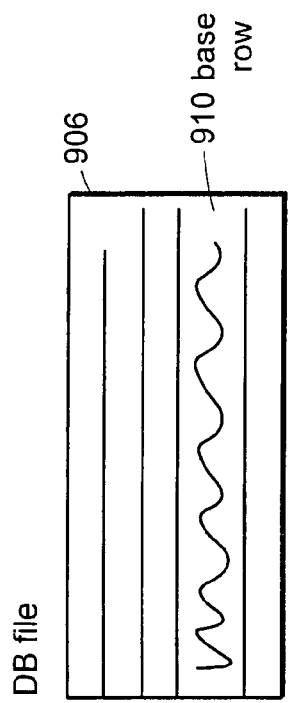

Rollback is a process through which a transaction log 204 is scanned for changes associated with a given data record, and the changes are applied in reverse order to yield the row value at a given revision or point in time. For example, in order to obtain the row value for transaction 904, collection agents 112a-x would have to roll back transactions applied to that row from the current rime to the time when the transaction was executed. In the example shown, transaction 908 will need to be rolled back before transaction 904 can be interpreted meaningfully. Illustrated in FIG. 9b is a database storage file 906, containing base row 910 to which the changes in transactions 904 and 908 are applied.

Figure 10:
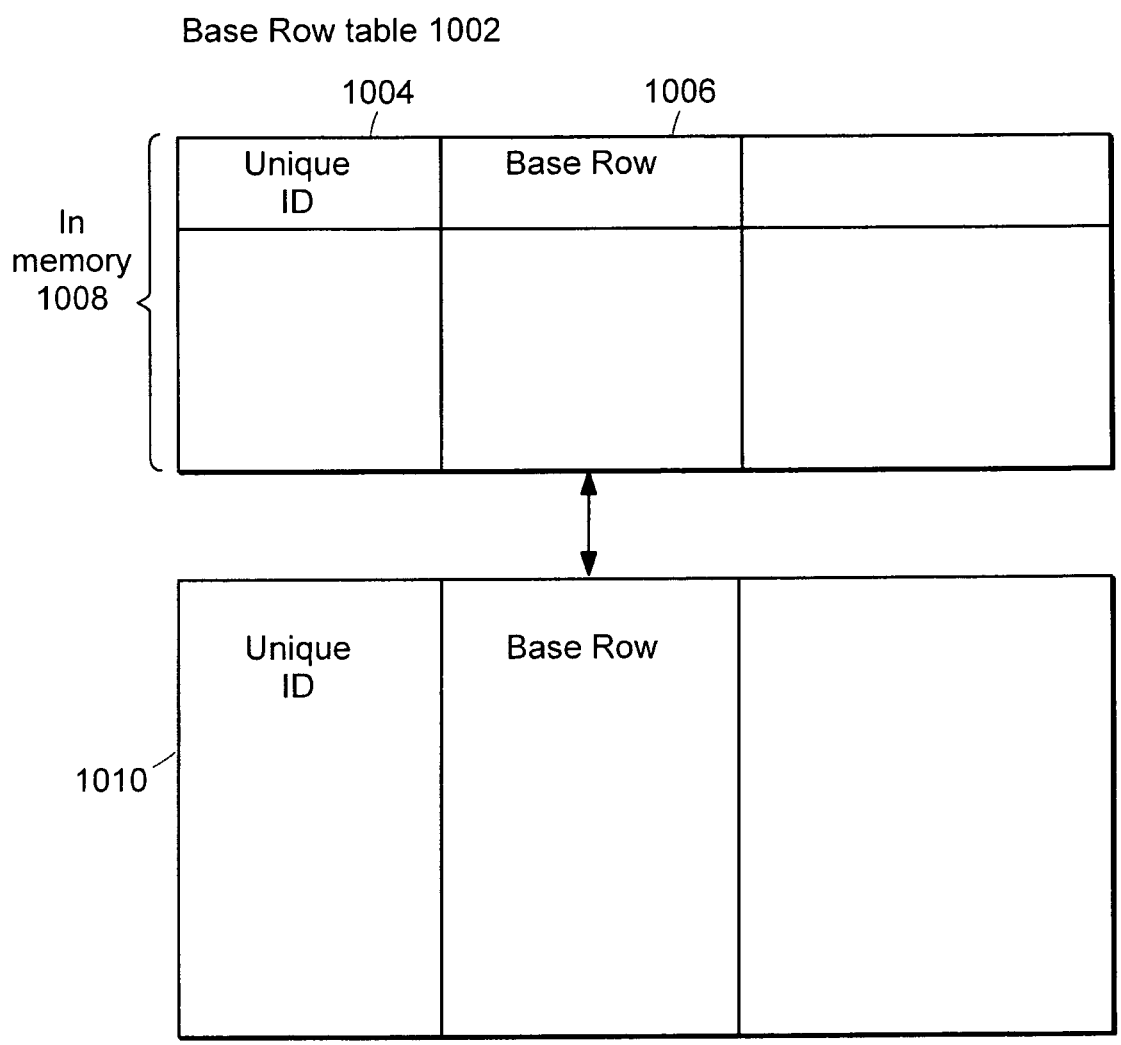
FIG. 10 is a schematic illustration of a base row table.

If all transactions in the transaction log 204 were to be rolled back, the collection process would take an extraordinarily long amount of time. In order to expedite the collection process, in one embodiment of the invention, base row table 1002 (FIG. 10) may be employed. The base row table 1002 is used to correlate unique IDs with the binary representation of the base rows. As illustrated in FIG. 10, the base row table 1002 may contain unique ID field 1004 for each base row 1006 already recovered. Such base row table 1002 may be kept in memory or be stored partially in memory (reference 1008) and partially on hard disk of the machine housing the collection agent (reference 1010).

Figure 11:
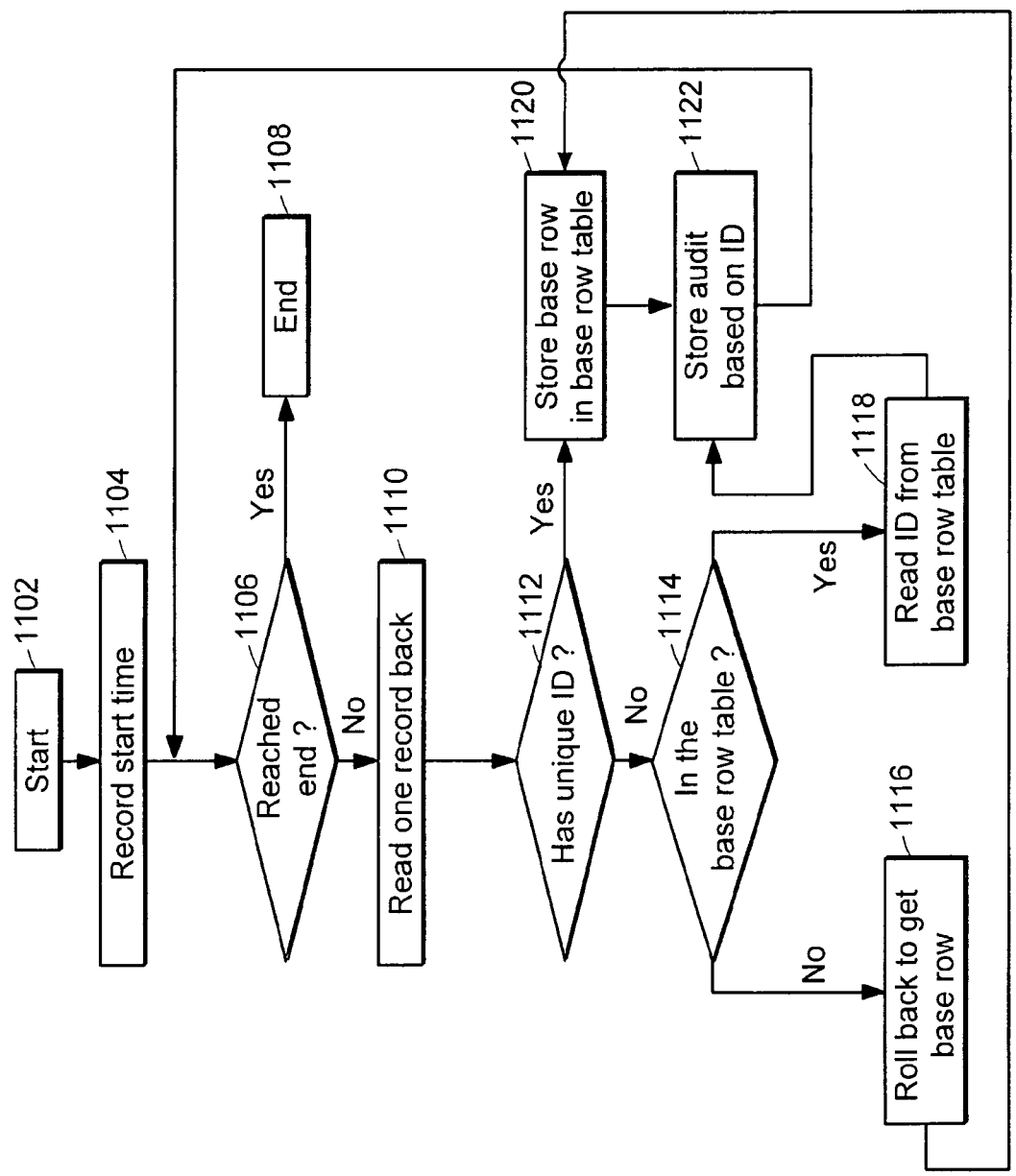
FIG. 11 is a flow chart illustrating determining unique IDs for entries in the transactional log.

The rollback process is illustrated in further detail in FIG. 11. The rollback process starts in step 1102, after which the start time is recorded in the history table in step 1104. It is possible that no new transactions have happened since the last collection process, or that all transactions have already been examined, as determined in step 1106. In that case, the rollback process completes in step 1108.

If there are records still to be examined, the most recent unexamined record is read in step 1110. If this record is an INSERT or DELETE transaction, that is, it has a unique ID associated with it, the base row associated with that unique ID is stored in the base row table in step 1120, after which the complete row value is stored in step 1122 and the process moves on to another record.

In cases where the record examined does not have an associated unique ID, the unique ID may be checked in the base row table in step 1114. If the unique ID is found in the base row table, the ID is read from the base row table in step 1118 and the row value stored based on that ID in step 1122. Only in those cases where the transaction does not have an indication of the unique ID and the unique ID is not already in the base row table does a rollback have to be performed, as shown in step 1116, after which the base row and the associated unique ID are stored in the base row table in step 1120.

In the majority of cases, a rollback does not have to be performed for all transactions, and even if it has to be performed, the values only need to be rolled back from whatever transactions happened after the beginning of the collection process. Collection of data from the transaction log is described in further detail in U.S. patent application Ser. No. 09/861,830, which is incorporated herein by reference in its entirety.

Data stored in repositories 110 is associated with appropriate logical keys. Logical keys are used to determine what defines a unique row for any given database table. Logical keys may be used by users to identify rows of the database. Those identifiers may later be used for browsing and analyzing the audit data. Logical keys may also be used to identify a record in the repositories 110. By defining a particular column or set of columns as the logical key for a table, a user is able to identify unique rows in the audited dataset and to reconstruct this data in case of need. In one embodiment of the invention, logical keys are unique on the per-database basis. In an alternative of the invention, logical keys may be unique across databases.

In one embodiment of the invention, when a table is set up for auditing, system 10 may automatically select columns to create a logical key for the table, for example, by detecting the primary key, if one is already established for the table. In another embodiment of the invention, this determination may be done by the most logical selection(s).

Figure 12:
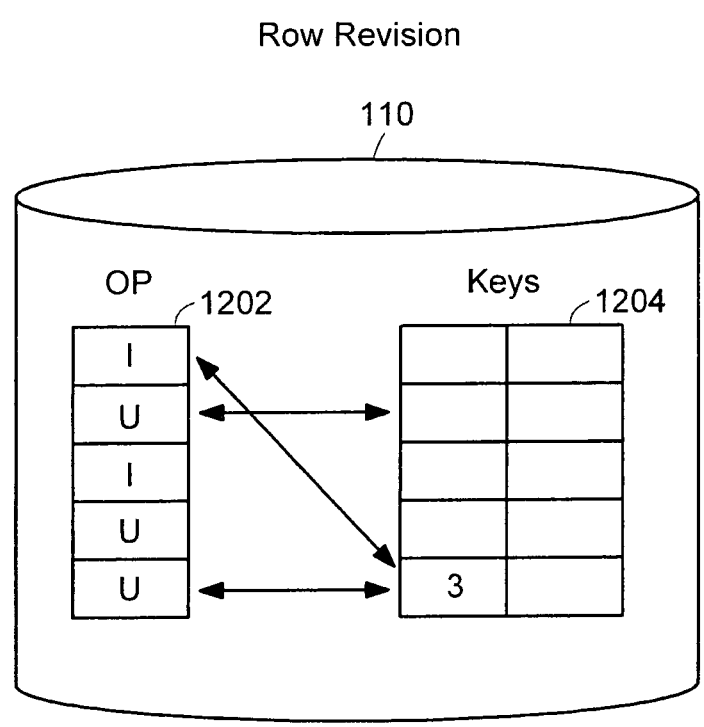
FIG. 12 is a schematic representation of a repository database schema allowing for row revision views.

In addition to defining logical keys for data records, users may be able to browse the records based on logical keys. Various user interfaces may provide such features as row revision—allowing users to view exactly what changes were made over time to a particular record, and by whom. In order to provide for efficient browsing, data in the repositories 110 may be organized in an appropriate schema, as illustrated in FIG. 12.

Two database tables: operations table 1202 and records table organized based on logical keys) 1204 may be employed to keep track of modifications to the data in the databases 104a-x. For each operation in the operations table 1202, there may be a link to the record affected by that operation, and vice versa. In such a way, when the user interface requests a trace of changes that happened to a particular record, all that may be necessary is to find that record in the records table 1204 and to follow the links from that record to the operations. Similarly, the data records affected by a particular operation may be easily found by following the links from the operations table 1202.

In an alternative embodiment of the invention, additional capabilities may be provided for, such as, for example, ability to browse audit trail of who viewed which data and when. In order to do so, additional operations, such as SELECT operations, may be stored in the operations table 1202. In yet another embodiment of the invention, a third table—Views table—may be employed to keep track solely of who viewed which data. As with other aspects of the system 10, the repository 110 table schema may be altered and managed from the management console 106.

While this invention has been particularly shown and described with references to preferred embodiments thereof, it will be understood by those skilled in the art that various changes in form and details may be made therein without departing from the scope of the invention encompassed by the appended claims.

What is claimed is:

1. A process of collecting database audit trail information associated with a database that maintains a database transaction log of first database activities performed on the database, said process comprising:

maintaining trace data, by a processor, regarding second database activities performed on the database, the trace data identifying session activities performed after session establishment and identifying before and after values, the second database activities resulting from commands sent to the database, the trace data identifying database activities not identifiable through the database transaction log maintained by the database;

collecting log information about the first database activities from the database transaction log to generate collected transaction log information, the collected transaction log information identifying information regarding a particular first database activity and including a first system process identifier associated with the particular first database activity;

collecting trace information about the second database activities from the trace data to generate collected trace information, the collected trace information identifying a particular session activity and including a second system process identifier associated with the particular session activity;

using the first system process identifier and the second system process identifier to correlate the collected transaction log information with the collected trace information to generate correlated information; and constructing the database audit trail information based on the correlated information.

2. The process of claim 1 wherein during the collecting log information, checkpoint markers are used to keep track of the information collected from the database transaction log.

3. The process of claim 1 further comprising generating an audit trail report.

4. The process of claim 1 wherein the collecting log information further comprises collecting SQL commands.

5. The process of claim 1 wherein the collecting log information further comprises collecting SELECT commands.

6. The process of claim 5 wherein the using the first system process identifier and the second system process identifier to correlate the collected transaction log information with the collected trace information further comprises correlating System Process Identifiers (SPIDs) from SELECT commands with SPIDs gathered from other commands.

7. The process of claim 5 wherein the SELECT commands are stored in a file between collections.

8. The process of claim 5 further comprising determining data viewed by a SELECT command.

9. The process of claim 8 wherein determining data viewed by a SELECT command further comprises analyzing a WHERE clause.

10. The process of claim 8 wherein determining data viewed by a SELECT command further comprises issuing an augmented SELECT command to the database.

11. The process of claim 1 wherein the collecting log information or the collecting trace information comprises ensuring that there are no information gaps or overlaps in each log file.

12. The process of claim 11 further comprising maintaining a collection table with records about a state and status of the collected information.

13. The process of claim 12 wherein the collecting trace information comprises collecting information from the trace data on a continuous basis.

14. The process of claim 11 wherein the collecting log information or the collecting trace information is performed periodically or in response to a command.

15. The process of claim 14 wherein database checkpoint markers are used to denote boundaries during the collecting log information.

16. The process of claim 1 further comprising generating an alert in response to a command executed on the database.

17. The process of claim 16 wherein the command executed on the database is one of: a database schema changing command and a database structure changing command.

18. The process of claim 16 wherein generating the alert further comprises generating the alert based on the collected trace information.

19. The process of claim 1 further comprising collecting audit information for a second database.

20. The process of claim 19 wherein the database and the second database are of different types.

21. The process of claim 20 further comprising capturing an audit trail of activities on both databases in a repository.

22. The process of claim 1 further comprising collecting information indicative of database structure changes.

23. The process of claim 22 further comprising collecting information indicative of system activity.

24. The process of claim 22 wherein the information indicative of database structure changes comprises data definition language commands.

25. The process of claim 1 further comprising defining logical keys for the database.

26. The process of claim 25 further comprising generating a report of data accesses based on the logical keys.

27. The process of claim 1 further comprising transferring the collected transaction log information or the collected trace information into a repository.

28. The process of claim 27 further comprising creating an audit trail of data modifications.

29. The process of claim 27 further comprising browsing a record revision history for a particular record selected by a user.

30. The process of claim 27 further comprising browsing a history of data modifications by a particular user.

31. The process of claim 27 wherein transferring the collected transaction log information or the collected trace information further comprises maintaining a collection table with records about information transfers.

32. The process of claim 27 further comprising generating a report of data accesses.

33. The process of claim 27 further comprising generating a report of data modifications.

34. The process of claim 27 further comprising archiving the collected transaction log information or the collected trace information.

35. The process of claim 27 further comprising analyzing information in the repository and reporting thereon.

36. The process of claim 35 further comprising analyzing data access patterns.

37. A system for collecting database audit trail information associated with a database that maintains a database transaction log of first database activities performed on the database, said system comprising:

a processor;

a trace collector configured to cause the processor to collect trace data regarding second database activities performed on the database, the trace data identifying session activities performed after session establishment and identifying before and after values, the second database activities resulting from commands sent to the database, the trace data identifying database activities not identifiable through the database transaction log maintained by the database;

a data collection agent configured to collect log information about the first database activities from the database transaction log to generate collected transaction log information, the collected transaction log information identifying information regarding a particular first database activity and including a first system process identifier associated with the particular first database activity, the data collection agent being further configured to collect trace information about the second database activities from the trace data to generate collected trace information, the collected trace information identifying a particular session activity and including a second system process identifier associated with the particular session activity, the data collection agent being further configured to use the first system process identifier and the second system process identifier to correlate the collected transaction log information with the collected trace information to generate correlated information; and a data analyzer configured to construct the database audit trail information based on the correlated information.

38. The system of claim 37 further comprising a repository agent to receive the collected log information or the collected trace information and insert it into a repository.

39. The system of claim 37 further comprising a user interface to browse a record revision history for a particular record selected by a user.

40. The system of claim 37 further comprising a user interface to browse a history of data modifications by a particular user.

41. The system of claim 37 wherein the collected trace information further comprises data about SELECT commands.

42. The system of claim 37 wherein the collected trace information further comprises information about commands relevant to session establishment.

43. A system for collecting database audit trail information associated with a database that maintains a database transaction log of first database activities performed on the database, said system comprising:

a processor;

means for maintaining trace data regarding second database activities performed on the database, the trace data identifying session activities performed after session establishment and identifying before and after values, the second database activities resulting from commands sent to the database, the trace data identifying database activities not identifiable through the database transaction log maintained by the database;

means for collecting log information about the first database activities from the database transaction log to generate collected transaction log information, the collected transaction log information identifying information regarding a particular first database activity and including a first system process identifier associated with the particular first database activity;

means for collecting trace information about the second database activities from the trace data to generate collected trace information, the collected trace information identifying a particular session activity and including a second system process identifier associated with the particular session activity;

means for using the first system process identifier and the second system process identifier to correlate the collected transaction log information with the collected trace information to generate correlated information; and means for constructing the database audit trail information based on the correlated information.

44. The system of claim 43 further comprising means for analyzing the collected information and reporting thereon.

45. An agent for collecting database audit trail information associated with a database that maintains a database transaction log of first database activities performed on the database, said agent comprising:

a processor;

a collector configured to cause the processor to collect log information about the first database activities from a database transaction log maintained by the database to generate collected transaction log information, the collected transaction log information identifying information regarding a particular first database activity and including a first system process identifier associated with the particular first database activity, the collector being further configured to collect trace information from trace data regarding second database activities performed on the database to generate collected trace information, the trace data identifying session activities performed after session establishment and identifying before and after values, the second database activities resulting from commands sent to the database, the trace data identifying database activities not identifiable through the database transaction log maintained by the database, the collected trace information identifying a particular session activity and including a second system process identifier associated with the particular session activity, and the collector being further configured use the first system process identifier and the second system process identifier to correlate the collected transaction log information with the collected trace information to generate correlated information; and a communicator configured to transfer the correlated information to a repository configured to provide the correlated information during construction of the database audit trail information.

46. The agent of claim 45, wherein the collector is further configured to send alerts in response to predetermined events.

47. The agent of claim 45, wherein the communicator is further configured to ensure reliable information transfer.

48. An agent for collecting database audit trail information associated with a database that maintains a database transaction log of first database activities performed on the database, said agent comprising:

a processor;

means for collecting log information about the first database activities from a database transaction log maintained by the database to generate collected transaction log information, the collected transaction log information identifying information regarding a particular first database activity and including a first system process identifier associated with the particular first database activity;

means for collecting trace information regarding second database activities performed on the database from trace data, the trace data identifying session activities performed after session establishment and identifying before and after values, the second database activities resulting from commands sent to the database, the trace data identifying database activities not identifiable through the database transaction log maintained by the database, the collected trace information identifying a particular session activity and including a second system process identifier associated with the particular session activity;

means for using the first system process identifier and the second system process identifier to correlate the collected transaction log information with the collected trace information to generate correlated information; and means for transferring the correlated information into a repository configured to provide the correlated information during construction of the database audit trail information.

49. The agent of claim 48 further comprising means for sending alerts in response to predetermined events.

50. The agent of claim 48, the means for transferring the correlated information further comprising means for ensuring a reliable transfer.

51. A method of collecting information by a data collection agent from a database that maintains a database transaction log, said method comprising:

collecting, by a processor, log information regarding first database activities performed on the database from the database transaction log maintained by the database to generate collected transaction log information, the collected transaction log information identifying information regarding a particular first database activity and including a first system process identifier associated with the particular first database activity;

collecting trace information from trace data regarding second database activities performed on the database to generate collected trace information, the trace data identifying session activities performed after session establishment and identifying before and after values, the second database activities resulting from commands sent to the database, the trace data identifying database activities not identifiable through the database transaction log maintained by the database, the collected trace information identifying a particular session activity and including a second system process identifier associated with the particular session activity;

using the first system process identifier and the second system process identifier to correlate the collected transaction log information with the collected trace information to generate correlated information; and transferring the correlated information into a repository.

52. The method of claim 51 further comprising sending alerts in response to predetermined events.

53. A system for auditing multiple databases that maintain respective database transaction logs, said system comprising:

a processor;

a trace collector, respective to each database, configured to cause the processor to collect trace data regarding first database activities performed on a database respective to the trace collector, the trace data identifying session activities performed after session establishment and identifying before and after values, the first database activities resulting from commands sent to the database respective to the trace collector, the trace data identifying database activities not identifiable through the database transaction log maintained by the database respective to the trace collector;

a data collection agent, respective to each database, configured to collect log information about second database activities from a database transaction log maintained by the database respective to the data collection agent to generate collected transaction log information, the collected transaction log information identifying information regarding a particular first database activity and including a first system process identifier associated with the particular first database activity, the data collection agent further being configured to collect trace information about the second database activities from the trace data to generate collected trace information, the collected trace information identifying a particular session activity and including a second system process identifier associated with the particular session activity, and the data collection agent further being configured to use the first system process identifier and the second system process identifier to correlate the collected transaction log information with the collected trace information to generate correlated information for the database respective to the data collection agent; and a repository configured to receive the correlated information from each respective data collection agent.

54. The system of claim 53 wherein at least two databases of the multiple databases are of different types.

55. The system of claim 53 further comprising a repository agent to receive the correlated information from the data collection agents.

56. The system of claim 53 further comprising a data analyzer to create database audit trail information based on the correlated information.

57. The system of claim 56 wherein the database audit trail information for the multiple databases is correlated into a coherent data set.

\* \* \* \* \*